UNITED STATES PATENT OFFICE.

DAVID E. BREINIG, OF NEW YORK, N. Y., ASSIGNOR TO HIMSELF AND A. C. CRONDAL, OF SAME PLACE.

IMPROVEMENT IN WATERPROOFING CORK AND OTHER MATERIALS.

Specification forming part of Letters Patent No. 54,462, dated May 1, 1866.

*To all whom it may concern:*

Be it known that I, DAVID E. BREINIG, of the city, county, and State of New York, have invented a new and useful Improvement in Waterproofing Cork and other Materials; and I do hereby declare that the following is a full, clear, and exact description of the same.

This invention relates to the use of a gum prepared by treating oils or other fatty substances with an alkali and a metallic salt, such as nitrate of lead, for the purpose of preparing and waterproofing cork, canvas, or other textile fabrics or leather, to be used in the manufacture of hats, caps, shoes, for wearing-apparel, or for covering roofs, ships' decks, or for other purposes.

In preparing the metalline gum which I use in treating cork or textile fabrics, I take fifty-six pounds of strong alkali, (caustic soda or potash,) dissolve it in forty-eight gallons of water, either by dry heat or steam, and to the solution I add twenty-eight gallons of either vegetable, animal, or mineral oil, or the equivalent in fats. This mixture I boil until the ingredients are united. I then take any suitable metallic salt, such as the nitrate of lead or copper, or the sulphates of zinc or copper, or carbonates of lead in solution of 24° Baumé, and add a sufficient quantity so that it will separate the metalline gum from the alkaline solution, said metalline gum being insoluble in water, and being composed of a fatty salt, the base of which is the oxide of lead, copper, or other metal. By washing repeatedly in clean water this metalline gum is freed from the alkaline salt, and I form them into rolls or sticks ready for use.

A similar gum can be made by boiling a metallic salt with oil and a little water, but this composition would be brittle and not so good for my purposes.

In treating cork or textile fabrics, I either dip the fabric first in the saponaceous solution above stated, and afterward in the solution of the metallic salt, and then press and dry; or I take ten pounds of the prepared metalline gum dissolved in two gallons of naphtha or other suitable solvent and dip the fabric therein and then press and dry it. After having been thus prepared the fabric is ready either to receive its cover, which adheres to it by the action of the gum itself, or it may be used for covering ships' decks, roofs, &c., and afterward painted or glazed over.

In treating cork with this metalline gum, I take one pound of said gum and add, while hot, one pint of naphtha or other solvent, mix it well while warm, spread it on the cork, and immediately lay on another layer of cork or of a textile fabric prepared as above stated, and pass a hot flat-iron or roller over it, which will unite them together. The heat of the iron causes the work to absorb part of the metallic salt and oil, thus making it strong, perfectly impervious to water, and elastic, and still open for the air through all its pores. Sometimes I also add some varnish to the metalline gum to increase its adhesive properties.

What I claim as new, and desire to secure by Letters Patent, is—

1. The use of metalline gum, such as herein described, for treating cork, leather, or other fabrics in the manner and for the purpose substantially set forth.

2. Forming the metalline gum on the fabric by first dipping it in the alkaline solution and afterward in the solution of the proper metallic salt as dissolved.

D. E. BREINIG.

Witnesses:
W. HAUFF,
M. M. LIVINGSTON.